US010020866B2

(12) United States Patent
Jidhage

(10) Patent No.: US 10,020,866 B2
(45) Date of Patent: Jul. 10, 2018

(54) WIRELESS COMMUNICATION NODE WITH ADAPTIVE COMMUNICATION

(71) Applicant: Telefonaktiebolaget LM Ericsson (publ), Stockholm (SE)

(72) Inventor: Henrik Jidhage, Mölndal (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/101,519

(22) PCT Filed: Dec. 5, 2013

(86) PCT No.: PCT/EP2013/075683
§ 371 (c)(1),
(2) Date: Jun. 3, 2016

(87) PCT Pub. No.: WO2015/082008
PCT Pub. Date: Jun. 11, 2015

(65) Prior Publication Data
US 2016/0380690 A1    Dec. 29, 2016

(51) Int. Cl.
*H04B 7/02*    (2018.01)
*H04L 1/02*    (2006.01)
(Continued)

(52) U.S. Cl.
CPC ............ *H04B 7/10* (2013.01); *H04B 7/0617* (2013.01)

(58) Field of Classification Search
None
See application file for complete search history.

(56) References Cited

U.S. PATENT DOCUMENTS 6,697,643 B1 *   2/2004   Hagerman ............... H04B 7/10
                                                  455/13.3
9,680,434 B2 *   6/2017   Yan ........................ H03G 3/004
(Continued)

FOREIGN PATENT DOCUMENTS

EP      2747304 A1      6/2014
WO      2011098975 A1   8/2011
(Continued)

OTHER PUBLICATIONS

International Search Report and Written Opinion dated Aug. 12, 2014 in International Application No. PCT/EP2013/075683, 8 pages.
(Continued)

*Primary Examiner* — Shuwang Liu
*Assistant Examiner* — Gina McKie
(74) *Attorney, Agent, or Firm* — Rothwell, Figg, Ernst & Manbeck, p.c.

(57) ABSTRACT

The present invention relates to a wireless communication node (1) comprising at least one antenna arrangement (2, 3, 4). Each antenna arrangement (2, 3, 4) comprises at least three antenna devices (5, 6, 7, 8), comprising corresponding pairs of antenna ports (A, B, C, D) with a corresponding first and second antenna port (P1A, P1 B, P1 C, P1D; P2A, P2B, P2C, P2D). Each antenna port (P1A, P1 B, P1C, P1D; P2A, P2B, P2C, P2D) is arranged downlink and uplink and is connected to a corresponding radio transceiver unit (11, 12, 13, 14, 15, 16, 17, 18). Each antenna device (5, 6, 7, 8) comprises at least one corresponding dual polarized antenna element (19, 20, 21, 22) arranged for transmitting and receiving signals at a first polarization (P1) via the corresponding first antenna port (P1A, P1B, P1 C, P1 D) and for transmitting and receiving signals at a second polarization (P2) via the corresponding second antenna port (P2A, P2B,
(Continued)

P2C, P2D). A beamforming arrangement (23) is arranged to apply beamforming on downlink signals. For an adaptive mode of operation for downlink, the beamforming arrangement (23) is arranged to apply beamforming such that one or two antenna beams (48*a*, 48*b*) is/are directed in a first direction (49), and such that one or two antenna beams (32*a*, 32*b*) is/are directed in a second direction (33).

12 Claims, 3 Drawing Sheets

(51) Int. Cl.
*H04B 7/10* (2017.01)
*H04B 7/06* (2006.01)

(56) References Cited

U.S. PATENT DOCUMENTS

| | | |
|---|---|---|
| 9,768,494 B2 * | 9/2017 | Johansson .............. H01Q 1/246 |
| 2003/0087673 A1 | 5/2003 | Walton et al. |
| 2003/0161410 A1 * | 8/2003 | Smith .................. H04B 7/0408 |
| | | 375/267 |
| 2009/0010356 A1 | 1/2009 | Engstrom et al. |
| 2010/0311469 A1 | 12/2010 | Smith et al. |
| 2011/0085448 A1 | 4/2011 | Kuwahara |
| 2011/0170625 A1 * | 7/2011 | Blankenship ........... H04L 1/007 |
| | | 375/295 |
| 2012/0007789 A1 * | 1/2012 | Petersson .............. H01Q 21/24 |
| | | 343/876 |
| 2013/0077966 A1 | 3/2013 | Gelbman et al. |
| 2013/0235807 A1 | 9/2013 | Lee et al. |
| 2014/0187174 A1 * | 7/2014 | Safavi .................. H04B 7/0413 |
| | | 455/73 |
| 2017/0374607 A1 * | 12/2017 | Wu ........................ H04W 48/16 |

FOREIGN PATENT DOCUMENTS

| | | | | |
|---|---|---|---|---|
| WO | WO 2011134519 A1 * | 11/2011 | ............ H01Q 1/246 |
| WO | 2013024852 A1 | 2/2013 | |

OTHER PUBLICATIONS

Yinggang, D., "Realize the Potential", Huawei presentation paper, Apr. 2009, Budapest, Hungary, 14 pages.
European Office Action issued in Application No. 13802031.8 dated Feb. 28, 2018, 5 pages.

* cited by examiner

WIRELESS COMMUNICATION NODE WITH ADAPTIVE COMMUNICATION

CROSS-REFERENCE TO RELATED APPLICATION(S)

This application is a 35 U.S.C. § 371 National Phase Entry Application from PCT/EP2013/075683, filed Dec. 5, 2013, and designating the United States.

TECHNICAL FIELD

The present invention relates to a node in a wireless communication system, where the node comprises at least one antenna arrangement. Each antenna arrangement in turn comprises at least three antenna devices positioned in a row, each antenna device comprising a corresponding pair of antenna ports with a corresponding first antenna port and second antenna port. Each antenna port is arranged for transmission of signals to user terminals, downlink, and for reception of signals from user terminals, uplink. Each antenna port is connected to a corresponding radio transceiver unit. Each antenna device comprises at least one corresponding dual polarized antenna element arranged for transmitting and receiving signals at a first polarization via the corresponding first antenna port and for transmitting and receiving signals at a second polarization via the corresponding second antenna port. Each antenna arrangement further comprises a baseband function which in turn comprises a beamforming arrangement with more than two beam port. The beamforming arrangement is arranged to apply digital signal combining and/or beamforming on downlink signals transmitted between the antenna ports and the beamforming arrangement via the radio transceiver units.

The present invention also relates to a method for communication between a node in a wireless communication network and at least one user terminal by transmission of signals to said user terminal, downlink, and for reception of signals from said user terminal, uplink. The node uses at least three antenna devices positioned in a row, where each one of the antenna devices has a corresponding pair of antenna ports. Each pair of antenna ports has a corresponding first antenna port and second antenna port, where each first antenna port is used for transmitting and receiving signals at a first polarization, and each second antenna port is used for transmitting and receiving signals at a second polarization.

BACKGROUND

In mobile telephony communication systems, nodes such as radio base stations are today arranged for MIMO (Multiple Input Multiple Output) communication and with adaptive beam forming. A node typical comprises multiple radio branches and multiple antenna columns that support beamforming and higher order MIMO. For example, an 8 TRX (transmit and receive) system with four dual polarized antenna columns may be used for 8T8R (eight transmit and 8 receive branches) 3-sector applications.

In a normal scenario for LTE (Long Term Evolution), for each sector, the node transmits cell specific reference signals such as CRS:s (cell specific reference signals) with relatively broad antenna beams, covering the sector, where each user terminal uses the received CRS:s to determine which beamformed antenna beam that is most suitable for downlink communication, from the node to the user terminal. The user terminal transmits this information to the node, which uses this information for creating such an antenna beam for downlink communication.

In uplink communication, from a user terminal to the node, beamforming is also applied, and the node is then arranged to alter beams in order to maximize the received signal quality.

However, some user terminals, further referred to as legacy user terminals, are not equipped for handling communication of this kind. One reason can be that the user terminal only features two receivers and therefore only supports two layer MIMO communication. Another reason can be that the user terminal does not support the required number of reference signals. Therefore, the node should support new user terminals as well as legacy user terminals, where the latter for example only support up to two reference signals and two layers on downlink. Support for both legacy user terminals and new user terminals is important in migration and mixed mode scenarios.

One solution to generate support for legacy user terminals that only support one or two layer MIMO communication is to map the applicable number of cell-specific reference signals as efficiently as possible to an equal number of beam ports. Efficiently can mean e.g. with good Tx power utilization or with good spatial characteristics for the applicable coverage area. The drawback of such a solution is that the performance will be similar to the performance of a sector with 2 transmit branches. It is thus desired to provide means for using the available resources as efficiently as possible for legacy users terminals.

SUMMARY

It is an object of the present invention to provide means for utilizing the available resources for legacy user terminals that are not equipped for handling communication of the kind described above as efficient as possible.

Said object is obtained by means of a node in a wireless communication system, where the node comprises at least one antenna arrangement. Each antenna arrangement in turn comprises at least three antenna devices positioned in a row, each antenna device comprising a corresponding pair of antenna ports with a corresponding first antenna port and second antenna port. Each antenna port is arranged for transmission of signals to user terminals, downlink, and for reception of signals from user terminals, uplink. Each antenna port is connected to a corresponding radio transceiver unit. Each antenna device comprises at least one corresponding dual polarized antenna element arranged for transmitting and receiving signals at a first polarization via the corresponding first antenna port and for transmitting and receiving signals at a second polarization via the corresponding second antenna port. Each antenna arrangement further comprises a baseband function which in turn comprises a beamforming arrangement with more than two beam port. The beamforming arrangement is arranged to apply digital signal combining and/or beamforming on downlink signals transmitted between the antenna ports and the beamforming arrangement via the radio transceiver units.

For an adaptive mode of operation for downlink, the beamforming arrangement is arranged to apply beamforming such that one or two antenna beams is/are directed in a first direction, and such that one or two antenna beams is/are directed in a second direction.

Said object is also obtained by means of a method for communication between a node in a wireless communication network and at least one user terminal by transmission of signals to said user terminal, downlink, and for reception of signals from said user terminal, uplink. The node uses at least three antenna devices positioned in a row, where each one of the antenna devices has a corresponding pair of antenna ports. Each pair of antenna ports has a corresponding first antenna port and second antenna port, where each first antenna port is used for transmitting and receiving signals at a first polarization, and each second antenna port is used for transmitting and receiving signals at a second polarization.

In an adaptive mode of operation for downlink, the method comprises the step of applying beamforming such that one or two antenna beams is/are directed in a first direction, and such that one or two antenna beams is/are directed in a second direction.

According to an example, the beamforming arrangement is arranged to apply beamforming such that a first antenna beam pair is directed in the first direction, and such that a second antenna beam pair is directed in the second direction. The first antenna beam pair comprises two antenna beams with mutually orthogonal polarizations, and the second antenna beam pair comprises two antenna beams with mutually orthogonal polarizations.

According to another example, the baseband function comprises an uplink signal combiner that is arranged to apply signal combining on uplink signals transmitted between the uplink signal combiner and the antenna ports via the radio transceiver units. For a normal mode of operation for uplink, the uplink signal combiner is arranged to apply signal combining in dependence of a present signal-to-interference-plus-noise ratio, SINR.

According to another example, the node is arranged to apply the adaptive mode of operation for downlink when at least one user terminal is determined to have a capability of up to two MIMO, Multiple Input Multiple Output, layers on downlink.

According to another example, for a normal mode of operation for downlink, said antenna arrangement is arranged for MIMO, Multiple Input Multiple Output, communication with user terminals that have a capability of more than two MIMO layers. The normal mode of operation for downlink is applied when at least one user terminal is determined to have a capability of more than two MIMO layers on downlink.

According to another example, node is arranged to apply the normal mode of operation for downlink alternatingly, or simultaneously, with the adaptive mode of operation for downlink when at least one user terminal is determined to have a capability of more than two MIMO layers on downlink and when at least one other user terminal is determined to have a capability of up to two MIMO layers on downlink.

More examples are disclosed in the dependent claims.

A number of advantages are obtained by means of the present invention. Mainly, the available resources are used as efficient as possible for legacy user terminals that are not equipped for handling communication with more than two MIMO layers.

BRIEF DESCRIPTION OF THE DRAWINGS

The present invention will now be described more in detail with reference to the appended drawings, where.

DETAILED DESCRIPTION

Figure 1:
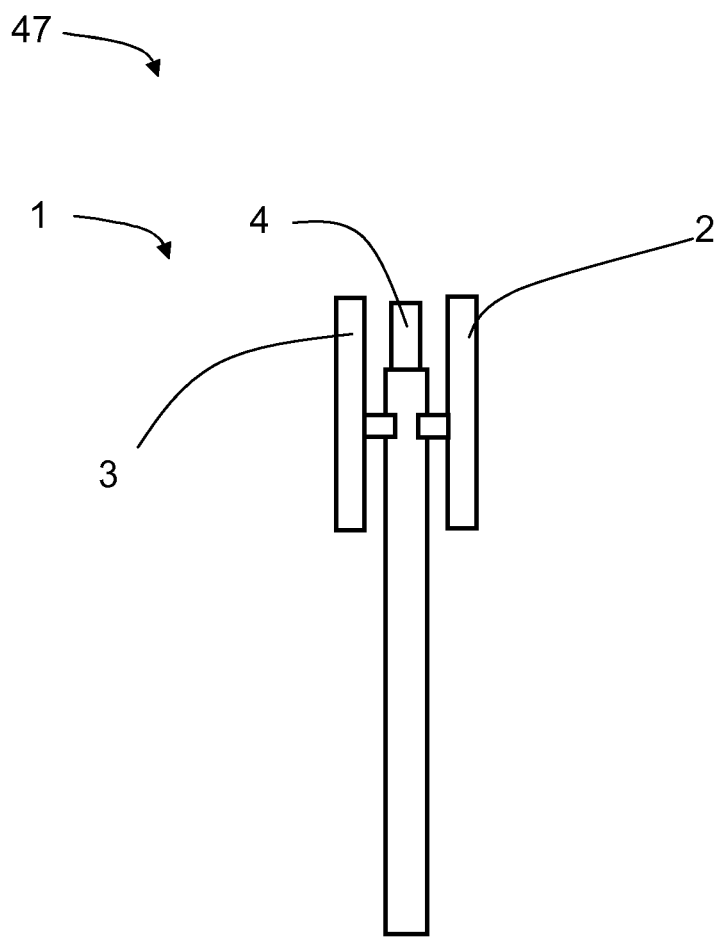
FIG. 1 shows a schematical view of a node in a wireless communication system.

With reference to FIG. 1, there is a node 1 in a wireless communication arrangement 47, the node comprising a first antenna arrangement 2, a second antenna arrangement 3 and a third antenna arrangement 4, where each antenna arrangement 2, 3, 4 is adapted to cover a certain sector in an azimuth plane in a previously known manner.

In the following, the first antenna arrangement 2 will be described more in detail, but this description is also valid for the other antenna arrangements 3, 4. The first antenna arrangement 2 comprises a first antenna device 5 with a first pair of antenna ports A, a second antenna device 6 with a second pair of antenna ports B, a third antenna device 7 with a third pair of antenna ports C, and a fourth antenna device 8 with a fourth pair of antenna ports D.

Each pair of antenna ports A, B, C, D comprises a corresponding first antenna port P1A, P1B, P1C, P1D and second antenna port P2A, P2B, P2C, P2D. This means that the first pair of antenna ports A comprises a corresponding first antenna port P1A and second antenna port P2A, the second pair of antenna ports B comprises a corresponding first antenna port P1B and second antenna port P2B, the third pair of antenna ports C comprises a corresponding first antenna port P1C and second antenna port P2C, and finally that the fourth pair of antenna ports D comprises a corresponding first antenna port P1D and second antenna port P2D.

Each antenna port P1A, P1B, P1C, P1D; P2A, P2B, P2C, P2D is connected to a corresponding radio transceiver unit 11, 12, 13, 14, 15, 16, 17, 18.

Furthermore, each antenna device 5, 6, 7, 8 comprises at least one corresponding dual polarized antenna element 19, 20, 21, 22 arranged for transmitting and receiving signals at a first polarization P1 via the corresponding first antenna port P1A, P1B, P1C, P1D and for transmitting and receiving signals at a second polarization P2 via the corresponding second antenna port P2A, P2B, P2C, P2D. The polarizations P1, P2 are mutually orthogonal.

Figure 2:
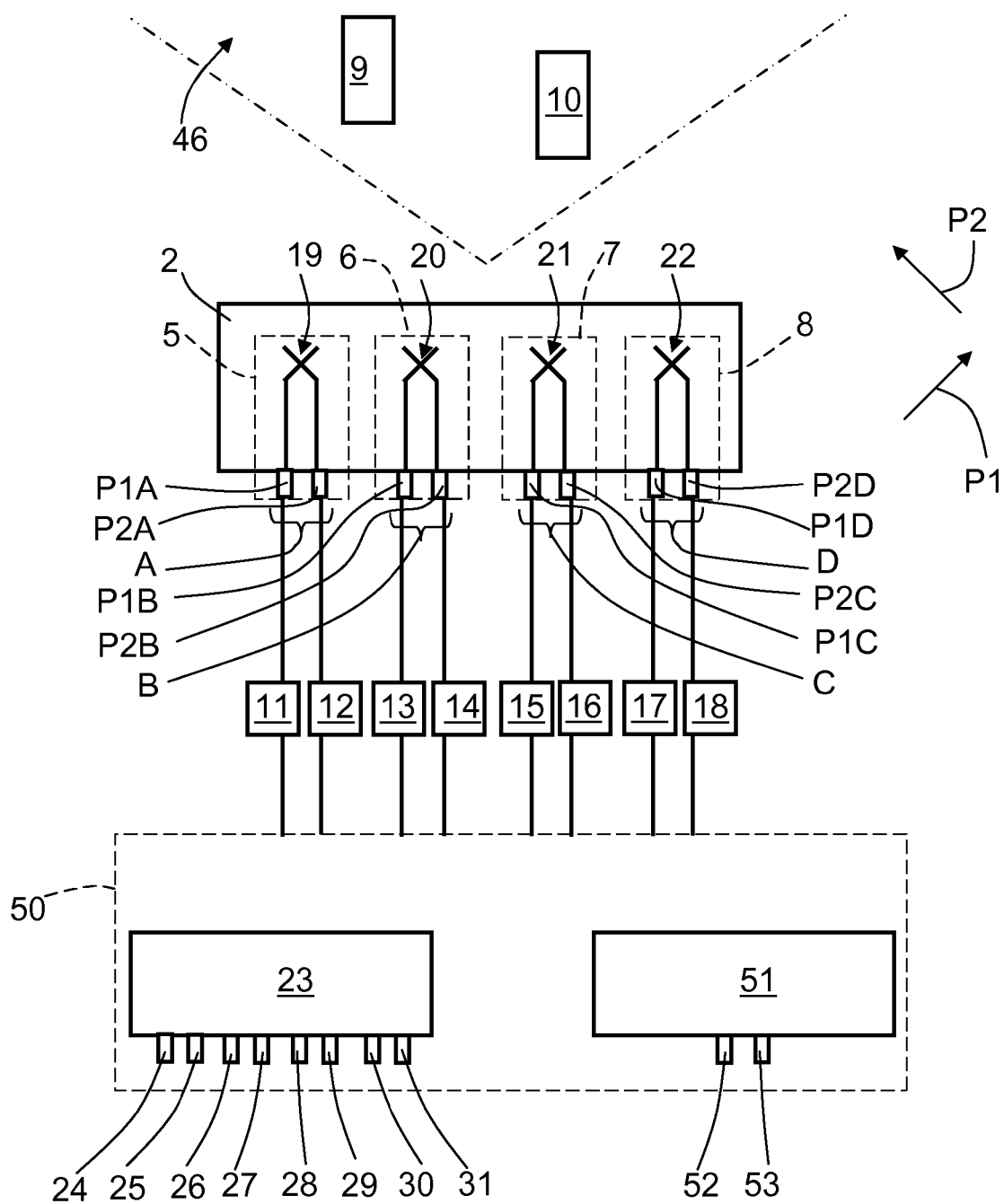
FIG. 2 shows a schematical view of an antenna arrangement according to the present invention.

This means that the first antenna device 5 comprises at least one corresponding dual polarized antenna element 19, the second antenna device 6 comprises at least one corresponding dual polarized antenna element 20, the third antenna device 7 comprises at least one corresponding dual polarized antenna element 21, and that the fourth antenna device 8 comprises at least one corresponding dual polarized antenna element 22. In FIG. 2, only one dual polarized antenna element is shown for each antenna device, but there may be a plurality of dual polarized antenna elements for each antenna device. Each dual polarized antenna element as shown in FIG. 2 may then be regarded as representing a plurality of dual polarized antenna elements, for example arranged as an antenna column.

The first antenna arrangement 2 further comprises a baseband function 50 which in turn comprises a digital beamforming arrangement 23 with eight beam ports 24, 25, 26, 27, 28, 29, 30, 31 for cell-specific reference signals. The beamforming arrangement 23 is arranged to apply digital beamforming on downlink signals transferred between the antenna ports P1A, P1B, P1C, P1D; P2A, P2B, P2C, P2D and the beamforming arrangement 23 via the radio transceiver units 11, 12, 13, 14, 15, 16, 17, 18.

The baseband function 50 also comprises an uplink signal combiner 51 having two signal ports 52, 53, where the number of signal ports for the uplink signal combiner 51 is the same as the number of MIMO layers in uplink. The uplink signal combiner 51 is arranged to apply digital signal combining on downlink signals transferred between the beamforming arrangement 23 and the antenna ports P1A, P1B, P1C, P1D; P2A, P2B, P2C, P2D via the radio transceiver units 11, 12, 13, 14, 15, 16, 17, 18. How the radio transceiver units 11, 12, 13, 14, 15, 16, 17, 18 are connected to digital beamforming arrangement 23 and the uplink signal combiner 51 is commonly known, and is therefore not indicated in detail in FIG. 2 for reasons of clarity.

The first antenna arrangement 2 is then enabled to be arranged for MIMO (Multiple Input Multiple Output) communication by means of eight receiving layers and eight transmitting layers, having eight transceiver branches, 8T8R. As shown in FIG. 2, there is a first user terminal 9 that has a capability of more than two MIMO layers on downlink, i.e. communication from the node 1 to the first user terminal 9 within a sector 46. Typically, a user terminal such as the first user terminal 9 has a capability of four or more MIMO layers, but should at least have a capability of more than two MIMO layers.

This means that the for a normal mode of operation for downlink, the first antenna arrangement 2 is arranged to transmit cell-specific reference signals (e.g. CRS:s) with relatively broad antenna beams by means of cell specific beamforming, where the first user terminal 9 uses the received cell-specific reference signals to determine which beamformed antenna beam that is most suitable for downlink communication, from the node to the user terminal. The first user terminal 9 transmits this information to the node, which uses this information for creating such an antenna beam for downlink communication by means of user-specific beamforming. The above is valid not only for the first user terminal 9, but for all user terminals in the current sector 46 with at least the same capability as the first user terminal 9.

However, in this example there is also a second user terminal 10 present, which second user terminal 10 has a capability of up to, or less than, two MIMO layers on downlink. This means that the second user terminal 10 does not have the sufficient capability for handling the normal mode of operation for downlink as described above, and thus constitutes a legacy user terminal.

Figure 3:
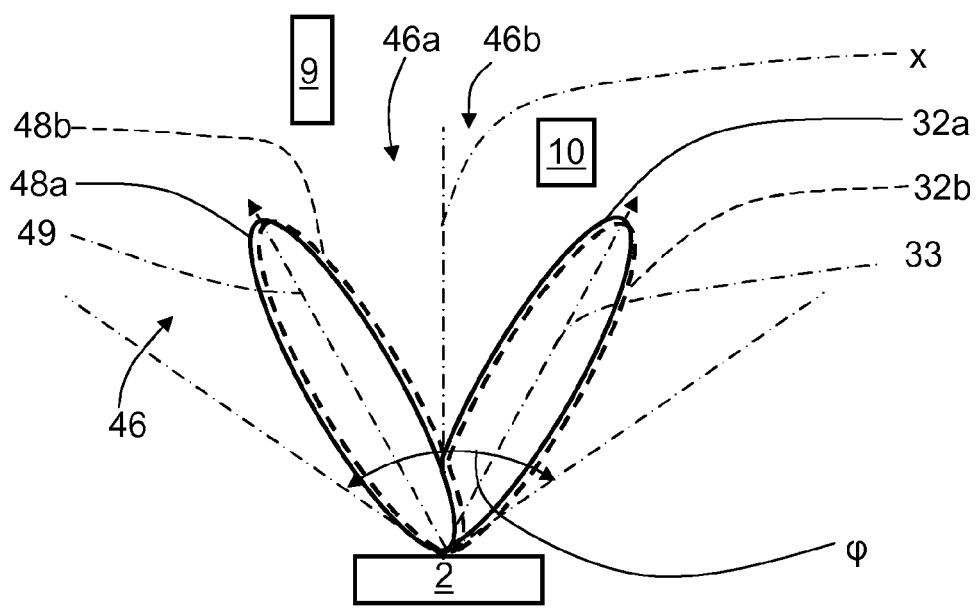
FIG. 3 shows a schematical example of an adaptive mode in downlink.

According to the present invention, with reference also to FIG. 3, for an adaptive mode of operation for downlink, the beamforming arrangement 23 is arranged to apply beamforming such that a first antenna beam pair 48a, 48b is directed in a first direction 49, and such that a second antenna beam pair 32a, 32b is directed in a second direction 33. The first direction and the second direction are separated such that the sector in question is divided into a first sub-sector 46a and a second sub-sector 46b. The first direction 49 is directed such that the first antenna beam pair 48a, 48b is arranged for communication within the first sub-sector 46a, and the second direction 33 is directed such that the second antenna beam pair 32a, 32b is arranged for communication within the second sub-sector 46b. The first antenna beam pair 48a, 48b comprises two antenna beams 48a, 48b with mutually orthogonal polarizations, and the second antenna beam pair 32a, 32b comprises two antenna beams 32a, 32b with mutually orthogonal polarizations. The mutually orthogonal polarizations may be different for the antenna beam pairs 48a, 48b; 32a, 32b, but suitably the mutually orthogonal polarizations correspond to the first polarization P1 and the second polarization P2 for both the first antenna beam pair 48a, 48b and the second antenna beam pair 32a, 32b.

This means that two dual polarized beams 48a, 48b on DL for the first sub-sector 46a and another two dual polarized beams 32a, 32b for the second sub-sector 46b are provided using digital beamforming on all eight radio transceiver units 11, 12, 13, 14, 15, 16, 17, 18. The beamformed patterns shall have approximately 35° beamwidth for sufficient 6-sector performance. This means that each one of the first sub-sector 46a and the second sub-sector 46b is able to support two cell-specific reference signals and two layer transmissions.

The number of user terminals may of course vary, the ones shown in the figures and described in the example are only an example.

The adaptive mode of operation is used when at least one user terminal, such as the second user terminal 10, is determined to have a capability of up to, or less than, two MIMO layers on downlink. In the adaptive mode, the 8T8R communication is thus re-configured in order to be able to support said user terminal which is not able to handle the full capacity of the first antenna arrangement.

For a normal mode of operation for downlink, the antenna arrangement 2 is arranged for MIMO communication with user terminals 9 that have a capability of more than two MIMO layers, where the normal mode of operation for downlink is applied when at least one user terminal 9 is determined to have a capability of more than two MIMO layers on downlink.

Figure 4:
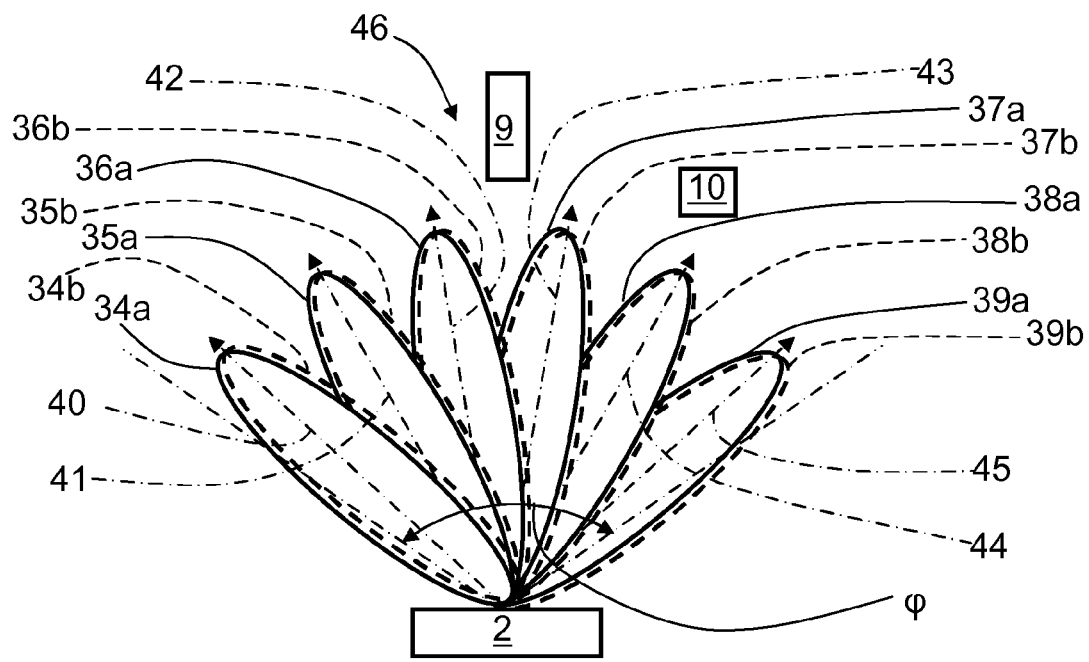
FIG. 4 shows a schematical example of a normal mode in uplink.

In a normal mode of operation for uplink communication, from a user terminal to the node, the uplink signal combiner 51, is arranged to apply signal combining in dependence of a present signal-to-interference-plus-noise ratio (SINR). This means that antenna beams may be altered according to the present received signal quality. For example, as shown in FIG. 4, there are six possible antenna beam pairs 34a, 34b; 35a, 35b; 36a, 36b; 37a, 37b; 38a, 38b; 39a, 39b that may be directed in six different corresponding directions 40, 41, 42, 43, 44, 45. Each antenna beam pair 48a, 48b; 32a, 32b; 34a, 34b; 35a, 35b; 36a, 36b; 37a, 37b; 38a, 38b; 39a, 39b comprises a first antenna beam 48a, 32a; 34a, 35a, 36a, 37a, 38a, 39a of the first polarization P1 and a second antenna beam 48b, 32b; 34b, 35b, 36b, 37b, 38b, 39b of the second polarization P2. At the signal ports 52, 53, one antenna beam pair at a time is obtained. Another example is that the SINR optimization generates antenna beams that reduce the interference in the system, or a combination of both examples.

By means of the present invention, a performance is provided that is equivalent to a 6-sector with two DL transmitters and eight UL receivers (2T8R) using an 8T8R system that also supports migration to and/or mixed mode with an 8T8R LTE (Long Term evolution) solution.

The node 1 is arranged to apply the normal mode of operation for downlink alternatingly, or simultaneously, with the adaptive mode of operation for downlink when at least one user terminal 9 is determined to have a capability of more than two MIMO layers on downlink and when at least one other user terminal 10 is determined to have a capability of up to two MIMO layers on downlink.

The present invention also relates to a method for communication between a node 1 in a wireless communication network and at least one user terminal 9, 10 by transmission of signals to said user terminal 9, 10, downlink, and for reception of signals from said user terminal 9, 10, uplink. The node 1 uses at least three antenna devices 5, 6, 7, 8 positioned in a row one after the other, each antenna device

5, 6, 7, 8 having a corresponding pair of antenna ports A, B, C, D with a corresponding first antenna port P1A, P1B, P1C, P1D and second antenna port P2A, P2B, P2C, P2D. Each first antenna port P1A, P1B, P1C, P1D is used for transmitting and receiving signals at a first polarization P1, and each second antenna port P2A, P2B, P2C, P2D is used for transmitting and receiving signals at a second polarization (P2).

In an adaptive mode of operation for downlink, the method comprises the step of applying beamforming such that a first antenna beam pair 48a, 48b is directed in a first direction 49, and such that a second antenna beam pair 32a, 32b is directed in a second direction 33.

The present invention is not limited to the examples above, but may vary freely within the scope of the appended claims. For example the node may comprise one or several antenna arrangements, each antenna arrangement being arranged to cover a certain sector. The sector or sectors do not have to lie in an azimuth plane, by may lie in any suitable plane, such as for example an elevation plane.

The antenna elements of each antenna arrangement 2 may be in the form of a one-dimensional array antenna or in the form of a two-dimensional array antenna. Each physical antenna element may in turn be constituted by several sub-elements or even sub-arrays.

Terms such as orthogonal should in this context not be interpreted as mathematically exact, but within what is practically obtainable in this field of technology.

Beam ports of this type are normally created in software by means of matrix multiplication, using a codebook matrix, which in turn is determined by an estimation of the present channel in a previously known manner.

The beam ports may be used for CRS (cell specific reference signal).

The present invention applies not only to three sector systems, but to any type of suitable wireless communication network.

It is conceivable that a legacy user terminal only has such a limited capacity that for an adaptive mode of operation for downlink, the beamforming arrangement 23 is arranged to apply beamforming such that only one antenna beam is directed in a first direction, and such that only one other antenna beam is directed in a second direction. As in the previous example, the first direction and the second direction are separated such that the sector in question is divided into a first sub-sector and a second sub-sector. The first direction is directed such that one antenna beam is arranged for communication within the first sub-sector, and the second direction is directed such that the other antenna beam is arranged for communication within the second sub-sector.

The invention claimed is:

1. A node in a wireless communication network, the node comprising:
a first antenna arrangement comprising a first antenna device, a second antenna device, and a third antenna device, wherein the first, second and third antenna devices are positioned in a row,
the first antenna device comprising a first antenna port and second antenna port,
the second antenna device comprising a third antenna port and a fourth antenna port,
the third antenna device comprising a fifth antenna port and a sixth antenna port,
each antenna port being arranged for transmission of signals to user terminals and for reception of signals from user terminals,
the first antenna port being connected to a first radio transceiver unit (RTU);
the second antenna port being connected to a second RTU separate and distinct from the first RTU;
the third antenna port being connected to a third RTU separate and distinct from the first RTU and the second RTU;
the fourth antenna port being connected to a fourth RTU separate and distinct from the first RTU, the second RTU, and the third RTU;
the fifth antenna port being connected to a fifth RTU separate and distinct from the first RTU, the second RTU, the third RTU, and the fourth RTU;
the sixth antenna port being connected to a sixth RTU separate and distinct from the first RTU, the second RTU, the third RTU, the fourth RTU, and the fifth RTU;
the first antenna device comprising a first dual polarized antenna element arranged for transmitting and receiving signals at a first polarization via the first antenna port and for transmitting and receiving signals at a second polarization via the second antenna port,
the second antenna device comprising a second dual polarized antenna element arranged for transmitting and receiving signals at the first polarization via the third antenna port and for transmitting and receiving signals at the second polarization via the fourth antenna port,
the third antenna device comprising a third dual polarized antenna element arranged for transmitting and receiving signals at the first polarization via the fifth antenna port and for transmitting and receiving signals at the second polarization via the sixth antenna port,
the first antenna arrangement further comprises a baseband function comprising a beamforming arrangement with more than two beam ports,
the beamforming arrangement being arranged to apply at least one of digital signal combining and beamforming on downlink signals transmitted between the antenna ports and the beamforming arrangement via the radio transceiver units, wherein
for an adaptive mode of operation for downlink, the beamforming arrangement is arranged to apply beamforming such that the first antenna arrangement is employed to simultaneously direct i) a first antenna beam in a first direction and ii) a second antenna beam in a second direction different than the first direction.

2. The node according to claim 1, wherein the beamforming arrangement is arranged to apply beamforming such that a first antenna beam pair is directed in the first direction, and such that a second antenna beam pair is directed in the second direction, where the first antenna beam pair comprises the first antenna beam and a third antenna beam, wherein the first and third antenna beams have mutually orthogonal polarizations, and the second antenna beam pair comprises the second antenna beam and a fourth antenna beam, wherein the second and fourth antenna beams have mutually orthogonal polarizations.

3. The node according to claim 1, wherein each antenna arrangement comprises a first antenna device with a first pair of antenna ports, a second antenna device with a second pair of antenna ports, a third antenna device with a third pair of antenna ports, and a fourth antenna device with a fourth pair of antenna ports.

4. The node according to claim 1, wherein the baseband function comprises an uplink signal combiner that is arranged to apply signal combining on uplink signals transmitted between the uplink signal combiner and the antenna ports via the radio transceiver units, where, for a normal mode of operation for uplink, the uplink signal combiner is arranged to apply signal combining in dependence of a present signal-to-interference-plus-noise ratio, SINR.

5. The node according to claim 1, wherein
the node is configured to determine whether a first user terminal is not capable of more than two Multiple Input Multiple Output (MIMO) layers on downlink, and
the node is further configured to operate in said adaptive mode of operation in response to determining that the first user terminal is not capable of more than two MIMO layers on downlink.

6. The node according to claim 1, wherein for a normal mode of operation for downlink, said antenna arrangement is arranged for Multiple Input Multiple Output (MIMO) communication with user terminals that have a capability of more than two MIMO layers, where the normal mode of operation for downlink is applied when at least one user terminal is determined to have a capability of more than two MIMO layers on downlink.

7. The node according to claim 6, wherein the node is arranged to apply the normal mode of operation for downlink alternatingly, or simultaneously, with the adaptive mode of operation for downlink when at least one user terminal is determined to have a capability of more than two MIMO layers on downlink and when at least one other user terminal is determined to have a capability of up to two MIMO layers on downlink.

8. A method for communication between a node in a wireless communication network and at least one user terminal by transmission of signals to said user terminal and for reception of signals from said user terminal, the node using at least three antenna devices positioned in a row, each antenna device having a corresponding pair of antenna ports with a corresponding first antenna port and second antenna port, each first antenna port being used for transmitting and receiving signals at a first polarization and each second antenna port being used for transmitting and receiving signals at a second polarization, the method comprising:

determining that an adaptive mode of operation should be employed, and
as a result of determining that the adaptive mode of operation should be employed, applying beamforming such that a first antenna beam is directed in a first direction while a second antenna beam is directed in a second direction different than the first direction, wherein
determining that an adaptive mode of operation should be employed comprises determining whether the user terminal is not capable of more than two Multiple Input Multiple Output (MIMO) layers on downlink.

9. The method according to claim 8, wherein method comprises the step of applying beamforming such that a first antenna beam pair is directed in the first direction, and such that a second antenna beam pair is directed in the second direction, where the first antenna beam pair comprises two antenna beams with mutually orthogonal polarizations, and the second antenna beam pair comprises two antenna beams with mutually orthogonal polarizations.

10. The method according to claim 9, wherein, for a normal mode of operation for uplink, the method comprises the step of applying signal combining in dependence of a present signal-to-interference-plus-noise ratio, SINR.

11. The method according to claim 9, wherein for a normal mode of operation for downlink, MIMO, Multiple Input Multiple Output, is used for communication with user terminals that have a capability of more than two MIMO layers, where the normal mode of operation for downlink is used when at least one user terminal is determined to have a capability of more than two MIMO layers on downlink.

12. The method according to claim 11, wherein the normal mode of operation for downlink is used alternatingly, or simultaneously, with the adaptive mode of operation for downlink when at least one user terminal is determined to have a capability of more than two MIMO layers on downlink and when at least one other user terminal is determined to have a capability of up to two MIMO layers on downlink.

* * * * *